United States Patent [19]

Brewster

[11] 4,113,326
[45] Sep. 12, 1978

[54] ALTERNATOR BEARING RETAINER PLATE
[75] Inventor: Franklin Crawford Brewster, Franklin Park, Ill.
[73] Assignee: Motorola, Inc., Schaumburg, Ill.
[21] Appl. No.: 706,670
[22] Filed: Jul. 19, 1976
[51] Int. Cl.² ............................................. F16C 35/00
[52] U.S. Cl. ...................................... 308/26; 308/163; 308/184 R
[58] Field of Search ............... 308/189 R, 189 A, 195, 308/236, 163, 26, 15, 184 R, 184 A, 135, 163

[56] References Cited
U.S. PATENT DOCUMENTS

| | | | |
|---|---|---|---|
| 2,653,063 | 9/1953 | Arndt et al. | 308/184 R |
| 3,351,398 | 11/1967 | Park et al. | 308/184 R |
| 3,586,403 | 6/1971 | Cooley | 308/184 |
| 3,625,327 | 12/1971 | Birdsey | 308/26 |

*Primary Examiner*—Richard A. Bertsch
*Attorney, Agent, or Firm*—James W. Gillman; Donald J. Lisa; Phillip H. Melamed

[57] ABSTRACT

Alternator bearing retaining assembly with a bearing locked in an alternator housing by means of a bent, resilient plate. One end of the plate is held by a groove in the housing and the other end is fastened to the housing so that the bearing is rigidly held during severe vibration. Assembly and replacement are also simplified.

17 Claims, 3 Drawing Figures

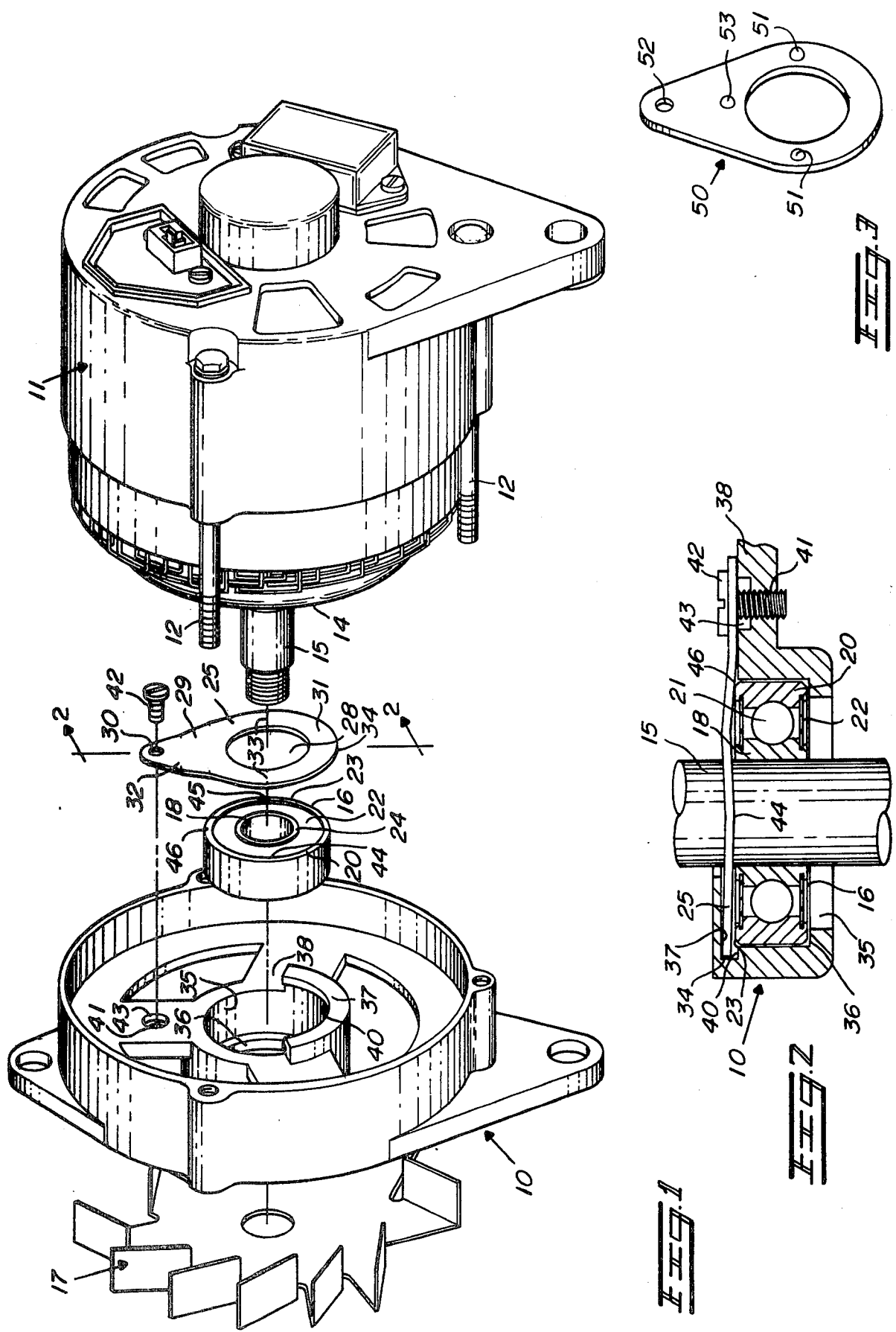

ALTERNATOR BEARING RETAINER PLATE

BACKGROUND OF THE INVENTION

1. FIELD OF THE INVENTION

This invention relates generally to alternators. In particular, this invention relates to an apparatus and method for retaining a bearing in an alternator housing.

2. DESCRIPTION OF THE PRIOR ART

In the prior art, alternator bearings have been retained by various methods. One of these methods employed a housing having a recess for receiving a bearing with the bearing being held in position by a resilient C-ring engaging in a grooved portion of the housing. Another method employed a flat plate which was fastened to the recessed housing with three screws holding the bearing therein in position. These methods have shortcomings. The method using the resilient C-ring requires a special assembly tool for compressing the C-ring before being released into the groove and does not provide a firm mounting for the alternator bearing under conditions of extreme vibration such as are found in 4-cylinder automobile engine applications where a flexible bearing retainer means will allow the bearing to progressively work loose. The second method of retaining the bearing by use of a plate and three screws requires having three tapped holes in the housing and assembling the plate to the housing with three screws.

SUMMARY OF THE INVENTION

It is a primary object of the invention to provide an improved, simplified bearing retainer apparatus and method for firmly holding a bearing.

It is another object of the invention to provide a retainer plate which biases a bearing into its mounting with a substantial force by providing at least three point contact of the retainer plate with the bearing so as to prevent movement of the bearing with respect to its mounting.

It is a further object of the invention to provide a method of retaining a bearing which is easily and economically fabricated, assembled, and replaced.

Briefly, the invention consists of a bearing mounted in a recess in a housing. The housing has a lip portion which contains a groove. One part of a retainer plate fits in the groove and another part of the plate is drawn against the housing by a fastening means. The retainer plate then forcefully biases the bearing into the recess, thereby rigidly locking the bearing in place.

In practicing the invention, an automotive alternator bearing retainer assembly is provided which includes a bearing having an inner and outer race and which is recessed in a housing. The housing also has a grooved lip into which part of a bent, resilient retainer plate is inserted. The bent portion of the plate contacts the outer race of the bearing in two places. The other end of the resilient retainer plate is drawn towards the housing and secured to the housing. When the plate is drawn sufficiently close to the housing it touches the outer race of the bearing at a third point. This provides at least three point contact between the bearing outer race and the retainer plate and prevents motion of the bearing within the housing recess.

Another embodiment of the invention uses a plate which contains raised portions. A part of the plate fits into a groove in the housing and the raised portions are caused to forcefully bear against the outer race of the bearing, thereby locking the bearing into the housing.

BRIEF DESCRIPTION OF THE DRAWINGS

For a more complete understanding of the invention reference should be made to the drawings in which:

FIG. 1 is an exploded perspective view of an automotive alternator assembly;

FIG. 2 is an enlarged partial cross-section assembled view of a portion of the alternator housing, the bearing, and the bearing retainer plate.

FIG. 3 is a perspective view of another embodiment of the bearing retainer plate.

DESCRIPTION OF THE PREFERRED EMBODIMENT

Referring now to the drawings, FIG. 1 shows an alternator assembly including a bearing retainer assembly. The alternator assembly includes a front housing 10 and a rear housing 11 which are attached by means of three bolts 12 (one not shown). Contained within the front and rear housings is a rotor structure 14 which is mounted on a shaft 15. One end of the shaft 15 is supported by a rear bearing (not shown) contained within the rear housing 11. The other end of the shaft is supported by an antifriction bearing 16. The shaft 15 engages and passes through the bearing 16 to a fan 17. The fan is attached to and rotates with the shaft, drawing cooling air through the alternator. A pulley (not shown) is also attached to the shaft and is driven by a belt from a power source (not shown).

The bearing 16 shown in FIG. 1 and also in cross-section in FIG. 2 has an inner race 18 and an outer race 20 engaged by the walls 21 which roll in the race ways provided in the inner and outer races. The bearing 16 is essentially cylindrical in shape and has a cylindrical outer surface formed by the outer race 20 and has a cylindrical inner surface formed by the inner race 18. The bearing may be provided with shields or seals 22 at the top and the bottom of the bearing. The shields or seals 22 prevent lubrication from leaving the ball chamber and also prevent dirt, water, and other harmful materials from entering the ball chamber.

A bearing retainer plate 25 is formed of resilient material which is capable of exerting considerable force when compressed. One embodiment of the plate has a pearshaped cross-section with a central opening 28 in its major lobe. Attached to the major lobe is a laterally disposed projection 29, the projection having a rounded end and also containing a mounting hole 30, which can be a fastener clearance hole or which can be threaded to receive a screw. The plate has two essentially flat portions. A first portion 31, which includes a semi-circular portion of the major lobe of the retainer plate. A second portion 32 includes the remainder of the major lobe together with the projection 29. The plate is formed such that the first and the second portions meet at an angle giving a bent shape to the retainer plate. The bend is located at a junction 33 between the first and second portions of said plate. When using a stiff material for the plate, the bend is formed with a radius sufficient to prevent excessive stress in the material. The first portion 31 of the retainer plate 25 has a curved periphery matching the shape of the part to which it mates. The central opening 28 in the major lobe of the retainer plate 25 is designed to provide clearance for the shaft 15 by having a diameter greater than the diameter of the inner race 18 of the bearing 16. The outer radius of the major lobe of the retainer plate 25 is greater than the radius of the outer race 20 of bearing 16.

The front housing 10 of the alternator contains a recess 35 for receiving the bearing 16. The front housing also contains a shoulder 36 at the bottom of the recess 35 for holding the bearing. Also formed on the front housing 10 is a lip 37 which projects above the surface 38 and is formed on the rim of the recess 35, thus having an arcuate shape. A groove 40 is formed in the lip 37, the groove being shaped to receive a part of a first portion outer edge 34 of the retainer plate 25. A threaded aperture 41 is also formed in the front housing 10 to receive a screw 42. The threaded aperture 41 also contains a counterbore 43 between the surface 38 and the aperture threads. This allows the part of screw 42 near the head to elastically stretch, locking the screw 42 in place.

The bearing 16 is held in the front housing 10 by means of retainer plate 25. In this embodiment, the depth of the recess 35 is less than the thickness of the bearing outer race 20. The bearing is placed in the recess with the result that the bearing outer race edge 23 will project above surface 38. The outer edge 34 of the first portion 31 of the retainer plate 25 is inserted into the matching groove 40 in the lip 37 of the front housing 10 after the bearing 16 has been placed in the recess 35. The second portion 32 of the retainer plate 25 is then drawn towards the front housing by means of the screw 42 engaging the threaded aperture 41. The bend 33 of the retainer plate 25 then contacts the bearing outer race edge 23 at a first contact point 44 and at a second contact point 45. When the retainer plate 25 is drawn close toward the front housing 10, the retainer plate 25 will contact the outer race edge 23 at a third contact point 46. This provides at least three point contact of the retainer plate 25 with the bearing outer race 20 and prevents a bearing 16 from rotating, rocking, or sliding within the recess 35.

FIG. 2 shows a detailed partial cross-sectional view of the assembled alternator bearing retainer assembly. Bearing 16 with inner race 18 and outer race 20 is engaged in recess 35. The bearing 16 is prevented from passing through the recess 35 by shoulder 36. The retainer plate 25 engages the groove 40 in the lip 37 at the outer edge of the first portion 31 of the retainer plate 25. The screw 42 threading into the threaded aperture 32 causes the retainer plate 25 to contact the bearing 16 outer race edge 23 at first contact point 44. The counterbore 43 allows the screw to stretch near the head and lock the screw in place. As the screw 31 is threaded into the housing, the second portion 32 of the retainer plate 25 contacts the bearing outer race 20 at the third contact point 46. Since the plate 25 is bent, when the plate is placed in position and the second portion 32 of the plate is drawn toward the housing, the distance between the mounting hole 30 and the outer edge 34 of the first portion 31 of the plate will be increased as the bend is straightened. Since the second portion 32 of the plate is held by screw 42, the outer edge 34 of the first portion 31 will be further forced into the groove 40, thereby taking up dimensional tolerances in the various pieces.

An alternative embodiment of the bearing retainer plate 25 is shown in FIG. 3. A flat retainer plate 50, similar in shape to retainer plate 25 but not having a bend, contains for best results at least two first raised portions 51, a second raised portion 53, and a fastener clearance hole 52. Alternatively, the hole 52 can be threaded to receive a screw passing through the housing 10 with a clearance hole replacing the threaded aperture 41. The first raised portions 51 contact the bearing 16 outer race 20 when a part of the flat retainer plate 50 is engaged in groove 40 of the lip 37 of the front housing 10. The flat retainer plate 50 is drawn towards the front housing 10 by means of screw 42 being threaded into the threaded aperture 41. Since raised portions 51 were initially in contact with the outer race tightening the screw 42 will bend plate 50 slightly until the raised portion 53 contacts the outer race and screw 42 is fully seated. Use of the retainer plate provides at least three points of contact between the flat retainer plate 50 and the outer race 20 of the bearing 16 so as to prevent the bearing 16 from either sliding, rocking, or rotating within the recess 35 of the front housing 10. When using this plate 50, it is not necessary that the bearing outer race edge 23 project above the housing surface 38.

While the particular embodiment of the invention has been shown and described, it should be understood that the invention is not limited thereto since many modifications may be made. It is therefore contemplated to cover by the present application any and all such modifications that fall within the true spirit and scope of the basic underlying principals disclosed and claimed herein.

I claim:

1. A bearing retainer assembly, which comprises:
   a bearing;
   a housing having a recessed opening containing the bearing and having a grooved lip portion;
   a resilient retainer plate having a first and a second portion, a part of the first portion being retained in the grooved lip; and
   means for drawing the second portion of the locking plate toward the housing to bias the bearing into the recessed opening in said housing.

2. The assembly of claim 1 wherein the bearing comprises an antifriction bearing having an inner and an outer race, and wherein said retainer plate rigidly positions said outer race with respect to said housing.

3. The assembly of claim 2 wherein the bearing outer race axial length is greater than the depth of the housing recessed opening, the resilient retainer plate first and second portions intersect at an angle, the intersection portion of said plate contacts and biases the outer race of the bearing in at least two places, and the second portion of the locking plate contacts and biases the outer race at a third place whereby the retainer plate makes at least three point contact with the bearing outer race.

4. The assembly of claim 3 wherein the means for drawing the second portion of the retainer plate to the housing is a threaded fastener received by threads formed in said housing.

5. The assembly of claim 2 wherein the resilient retainer plate contains a plurality of raised portions which contact and bias the bearing outer race and rigidly position said outer race with respect to said housing.

6. The assembly of claim 5 wherein the means for drawing the second portion of the retainer plate to the housing is a screw received by threads formed in said housing.

7. The assembly of claim 1 wherein the resilient retainer plate first and second portions are essentially flat and nonplanar and the intersection between these portions contacts an antifriction bearing outer race of said bearing at a first and a second point to rigidly fix said outer race with respect to said housing.

8. A resilient, metallic retainer plate of pearshaped cross-section having a central-opening in its major lobe and having a laterally disposed projection, said projection having a hole, and the major lobe having a bend running perpendicular to a line between the center of the major lobe and the hole, and including the center of the major lobe.

9. In an automotive alternator bearing assembly having a bearing means and a housing, the improvement of which comprises:
  a housing having a recessed opening containing the bearing means and having a grooved lip portion;
  a resilient retainer plate having a first and a second portion, a part of the first portion being retained in the grooved lip; and
  means for drawing the second portion of the locking plate toward the housing to bias the bearing means into the recessed opening in said housing.

10. The alternator bearing assembly of claim 9 wherein the bearing comprises an antifriction bearing having an inner and an outer race, and wherein said retainer plate rigidly positions said outer race with respect to said housing.

11. The alternator bearing assembly of claim 10 wherein the bearing outer race axial length is greater than the depth of the housing recessed opening, the resilient retainer plate first and second portions intersect at an angle, the intersection portion of said plate contacts and biases the outer race of the bearing in at least two places, and the second portion of the locking plate contacts and biases the outer race at a third place whereby the retainer plate makes at least three point contact with the bearing outer race.

12. A resilient, metallic retainer plate of pearshaped cross-section having a central opening in its major lobe and having a laterally disposed projection, said projection having a hole, and the major lobe having a plurality of raised portions located around the central opening.

13. A method of retaining an automotive alternator bearing in a housing which comprises the steps of:
  forming a recessed opening for the bearing in the housing;
  forming a lip containing a groove in the housing;
  forming a resilient retainer plate with a first and second portion, the first portion being adapted to be retained in the lip containing the groove;
  inserting the first portion of the plate into the groove; and
  drawing the second portion of the locking plate to the housing to bias the bearing into the recessed opening in said housing.

14. The method of claim 13 wherein the step of forming the recessed opening for the bearing in the housing further comprises forming the recess to a depth less than the axial length of the outer race of an antifriction bearing having an inner and outer race, and wherein said drawing step rigidly positions the bearing with respect to said housing.

15. The method of claim 14 wherein the step of forming the resilient retainer plate further includes the step of forming the plate with first and second portions intersecting, the intersection portion being adapted to contact an antifriction bearing outer race at a first and a second point.

16. The method of claim 15 wherein the drawing of the retainer plate to the housing further includes drawing the second portion of the retainer plate to the housing to contact the bearing outer race at a third point.

17. The method of claim 13 wherein the forming of the resilient retainer plate further includes forming on the plate a plurality of raised portions which contact and rigidly bias and position the bearing outer race into the housing recess.

* * * * *

UNITED STATES PATENT AND TRADEMARK OFFICE
CERTIFICATE OF CORRECTION

PATENT NO. : 4,113,326
DATED : September 12, 1978
INVENTOR(S) : Franklin Crawford Brewster It is certified that error appears in the above-identified patent and that said Letters Patent are hereby corrected as shown below:

The Figure appearing on the title (first) page of the patent should be canceled and replaced by Figure 1 appearing in the drawings of the patent.

Signed and Sealed this

Nineteenth Day of December 1978

[SEAL]

Attest:

RUTH C. MASON
Attesting Officer

DONALD W. BANNER
Commissioner of Patents and Trademarks